United States Patent [19]
Barlow et al.

[11] 4,345,764
[45] Aug. 24, 1982

[54] HAND-HELD ELECTRONIC GAME

[75] Inventors: Gordon A. Barlow; John R. Krutsch, both of Glenview; Richard A. Karlin, Chicago, all of Ill.

[73] Assignee: Gordon Barlow Design, Skokie, Ill.

[21] Appl. No.: 116,835

[22] Filed: Jan. 30, 1980

[51] Int. Cl.³ .............................................. A63F 9/00
[52] U.S. Cl. .................................................... 273/313
[58] Field of Search .................... 273/313, 1 E, 85 G, 273/310, 311, 312, 314, 315, 316

[56] References Cited
U.S. PATENT DOCUMENTS

| | | | |
|---|---|---|---|
| 2,467,180 | 4/1949 | Anderson | 273/313 |
| 3,790,172 | 2/1974 | Nakamura | 273/313 |
| 4,270,755 | 6/1981 | Willhide et al. | 273/313 |

*Primary Examiner*—William H. Grieb
*Attorney, Agent, or Firm*—Alter and Weiss

[57] ABSTRACT

A hand-held electronic game which uses a two-way mirror arrangement to simulate the battle between the player's rocket ship protected by barriers and a plethora of enemy rocket ships. The enemy rocket ships and the barriers are affixed on two parallel, spaced apart, vertical planes. Apertures in the front plane give the impression in the two-way mirror that the devices on the different planes are all in the same plane. In addition, the player's rocketship and death ray, on a horizontal plane, are also projected on the two-way mirror so that it appears that all the devices are in a single plane.

22 Claims, 8 Drawing Figures

HAND-HELD ELECTRONIC GAME

This invention is concerned with hand-held games; and more particularly, with such hand-held games which simulate battles between the player's rocket ship and a plethora of death dealing space invaders.

The games in penny arcades at one time were either mechanical or electro-mechanical. In the electro-mechanical arcade games, when certain micro-switch bumpers were hit by a projectile directed by the player, relays would be operated to make noises, light lights, and add up scores.

As the state of the art progressed, so did the sophistication of the penny arcade games. With the advent of games using cathode ray tubes, it became possible to have games which simulated, among other things, battles in space between different forces of miniature, simulated spaceships. It became possible to manipulate and direct a spaceship around the face of the cathode ray tube.

Thus, it became possible to create games wherein a pair of players, each manipulating his own spaceship, tried to destroy the other player's spaceship. With the advent of micro-processors, it became possible for an individual player to play against the micro-processor controlled "enemy" or "invading spaceships". This type of penny arcade game became extremely popular and was set up for either a pair of individuals playing each other or a single individual playing against the machine.

However, the penny arcade type games using cathode ray tube equipment are relatively heavy, unwieldy and expensive. Therefore, such games are not amenable for home use. Alternative games are available which require the use of the cathode ray tube of the television receiver. Those games have the drawbacks of inactivating the television receivers, damaging and wearing out the cathode ray tubes of the television receivers, as well as having a lack of mobility.

Accordingly, an object of the present invention is to provide new and unique hand-held electronic games.

A related object of the present invention is to provide hand-held electronic games wherein the player is matching his skill against programmed equipment.

Yet another object of the present invention is to provide hand-held electronic games wherein the player manipulates defending spaceships armed with "death rays" to defend against a plethora of invading spaceships.

A related object of the present invention is to provide hand-held electronic games wherein the plethora of invading spaceships is "above" the defending spaceship dropping "bombs" which the defending spaceship must avoid to remain viable, while using its "death ray" in an attempt to destroy the invading spaceships.

Still another and related object of the present invention is to automatically increase the tempo of the bomb dropping operation as the game progresses thereby making it more difficult for the defending spaceship to kill the enemy spaceships and avoid being destroyed.

Still another object of the present invention is to provide hand-held electronic games wherein the invading spaceships are in one plane; barriers, which the defending spaceship can use to avoid the bombs, are in a plane parallel to the one plane; and wherein the defending spaceship is in yet another plane—all three planes being projected upon an angularly held two-way mirror so that the person using the game sees the invading spaceships, the barriers and the defending spaceship all in a single plane.

Yet another object of the present invention is to provide mechanical means for moving the defending spaceship so as to avoid the bombs of the invading spaceship. The means for moving the defending spaceship also acting to move the invading spaceships, thereby making it more difficult for the defending spaceship to "shoot down" the invading spaceships and to avoid the invader's bombs.

Yet another object of the present invention is to provide sound effects based upon or concurrent with occurrences in the hand held electronic game.

A preferred embodiment of the present invention features a hand-held box with a viewing screen at one end. A motion controlling push button lever is mounted on each side of the hand-held box along with a "firing" push button switch on at least one side of the box. The viewing screen reveals a six by five matrix of LED's (six columns and five rows) representing the invading spaceships. In addition, there is a barrier LED for each column. Another LED represents the defending spaceship. The invading LED's, the barrier LED's and the defending LED's are different colors.

When the on-off switch is turned to "on", the matrix of invading LED's, the barrier LED's and the defending LED's are all energized. Responsive to the position varying lever buttons, the defending spaceship moves selectively right or left. Simultaneous thereto, the matrix of invading spaceships is first moved to one side limit, for example, the right side, and then to the other side limit, for example, the left side regardless of whether the defending spaceship is being moved right or left.

Responsive to the operation of the firing switch, the defending spaceship fires its "death ray" comprising a plurality of LED's in a straight line which are lit sequentially to simulate the firing. If the defending space ship is aligned with an invading spaceship so that the "death ray" hits the invading spaceship, the invading spaceship is destroyed. The destruction is simulated by a distinctive explosive sound.

In the meantime, the invading spaceships are dropping bombs responsive to a program set in a microprocessor. The dropping of the bombs are simulated by a burn or brightening or the LED's in the column dropping the bombs. If the defending spaceship is aligned with the column dropping the bombs at the time the bottommost LED of the column exhibits a brightened intensity, the defending spaceship is "destroyed". The destruction is simulated by a burn of the defender and by another distinctive sound. After the "destruction" of the defending spaceship, it is sequentially replaced by two more defending spaceships.

In addition to the physical movement of the invading spaceships, the six by five matrix is shifted electronically in a larger matrix, such as in an eight by six matrix. After a given number (15) of invading spaceships have been destroyed, the tempo of the game is automatically increased by increasing the speed and the frequency of the bombs being dropped by the invaders. In addition, the tempo of the electronic shifting is also increased. The increased tempo of the game is matched by the increased tempo of a background "heartbeat" sound that is continually emitted, while the game is being played.

Throughout the game the surviving invading spaceships are automatically shifted to vacated LED positions in their own row. If an entire grid of invaders is destroyed, a duplicate array or grid of 30 invaders reappears. The tempo of the play of the second grid is faster than the first grid. Similarly, the tempo of play of the third grid is faster than that of the second grid. The score is automatically computed after three defending spaceships have been destroyed and the total number of invaders destroyed is exhibited on the invader grid.

The barrier LED's start with a maximum brightness. After being hit a programmed number of times (i.e., 15) either by the invading spaceship bombs or the defending spaceship laser death ray, the barrier is deenergized and from then on inactive as a barrier. For the second and third grids, the barriers are destroyed with fewer than the original number of hits (i.e, 15).

These and other objects and features of the present invention will be best understood by making reference to the accompanying drawings, wherein.

Figure 1:
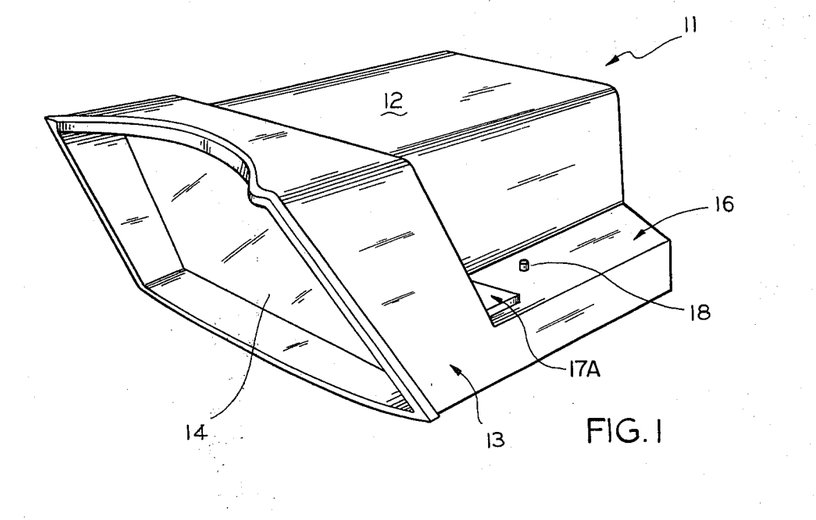
FIG. 1 is a pictorial view of the hand-held electronic spaceship battle game.

In FIG. 1 the pictorial view of the hand-held electronic spaceship battle game 11 shows the outer cover 12 having a hood section 13, a viewing screen 14 and a pair of handle portions, one of which is seen at 16. On the handle portion is seen a defending spaceship positioning push button lever switch 17A and the electrical firing switch 18.

Figure 2:
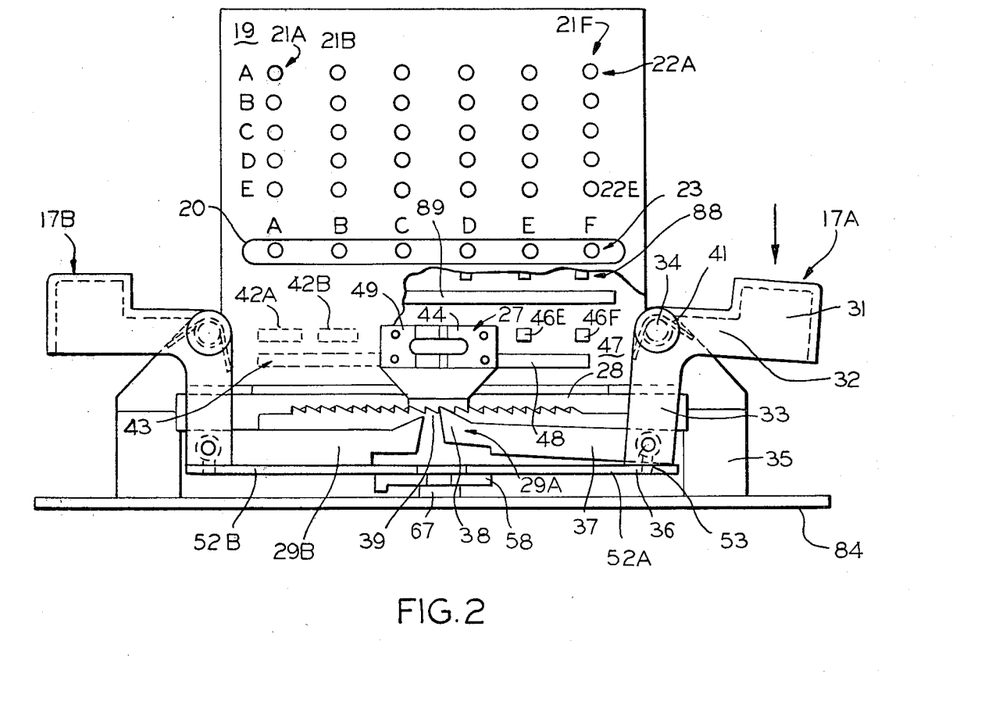
FIG. 2 is a front view of the hand-held electronic game with the hood and viewing screen removed.

The view of the hand-held game in FIG. 2 is with the cover 12 removed. Therein is shown means for depicting a plethora of invading spaceships. More particularly, a six by five matrix of LED's is shown on board 19. The matrix comprises six columns of LED's 21A through 21F. Each column has five rows 22A through 22E. Initially, all 30 LED's are lit. In a preferred embodiment the invading spaceships comprise yellow LED's.

Barrier means are provided which may be aligned with each of the columns. More particularly, six LED's 23A through 23F are shown beneath each of the columns 21A through 21F. These LED's in a preferred embodiment are green.

Defending spaceship indicating means are provided. More particularly, a defending spaceship is indicated by an LED 24 seen, for example, in FIG. 3. The spaceship LED 24 is aligned with a death or laser ray indicating means. More particularly, LED's 26A through 26G are shown aligned with spaceship LED 24. Both the spaceship LED 24 and the death ray LED's 26A through 26G are mounted on a horizontally positioned wand assembly 27.

The wand assembly 27 is coupled by any well known means to means for moving the wand assembly sideways relative to the invading spaceships and the barriers. More particularly, the wand assembly 27 is shown coupled to ratchet bar 28.

The defending spaceship's push button positioning levers 17A and 17B operate pawl means, such as pawl bars 29A and 29B. More particularly, the levers, as shown, are angle units which include push buttons, such as push button 31 integral to the horizontal section 32 that leads to the vertical section 33. A pivot pin 34 is located at the vertex or the juncture of the vertical and horizontal sections. The pawl bar 29A is fixedly attached to the vertical section 33 by any well known means, such as fastener 36.

The pawl bar 29A basically comprises main rod section 37 terminating in the pawl point 38. The pawl point 38 is designed to mesh into the teeth 39 of the rack bar 28. Thus, when the defending spaceship moving lever 17A is pressed, point 38 moves upward to mesh with rack teeth 39 and forces the rack bar 28 and the wand coupled thereto to the right. The operation of defending spaceship moving lever 17B forces the rack bar 28 and the wand coupled thereto to the left. Thus, the wand 27 is moved left or right responsive to pressure on the defending spaceship moving push button levers 17A and 17B.

Means are provided for normally maintaining the pawl bar 29A clear of the rack. More particularly, wishbone springs, such as springs 41, are positioned at pivot point 34. The lever 17B and its associated pawl rod 29B are mirror images of lever 17A and pawl rod 29A; consequently, the description of the lever 17A and pawl rod 29A suffices for lever 17B and pawl rod 29B.

The location of the wand 27 is automatically, electrically tracked by means, such as contact segments 42A and 42B, shown on the back of board 19, aligned with columns 21A and 21B in conjunction with contact strip 43. A contact or brush 44 on the wand makes contact simultaneously with the conducting segments corresponding to the appropriate column and the contact strip.

Thus, when the wand is located so that the defending spaceship is aligned with column 21A, then contact 44 completes a circuit from segment 42A to strip 43. This indicates to the micro-processor that the defending spaceship is in a position to fire its death ray at the invading spaceships of column 21A. It also is in a position, of course, to be destroyed by the bombs programmed to be dropped by the invading spaceships of column 21A.

Means are also provided to automatically indicate to the control means, such as the micro-processor, when the defending spaceship is aligned with one of the barriers 23A through 23F. This means is shown, for example, in FIG. 2, as conducting segments 46E and 46F on the board 47 which holds the barrier LED's 23A through 23F. Spaced apart from conducting segments is conducting strip 48. When the wand 27 is positioned in alignment with barrier LED 23E, for example, then a contact or brush 49 on wand 27 completes a circuit from segment 46E to strip 48.

Linkage and mechanism means are provided for moving the board 19 containing the spaceship invaders responsive to the operation of either of the defending spaceship moving levers 17A or 17B. The moving means causes the board to move in a first lateral direction, regardless of whether 17A or 17B is activated; and in the opposite lateral direction, after reaching the furthest lateral point in the first direction.

Figures 4, 5, 6, 7:
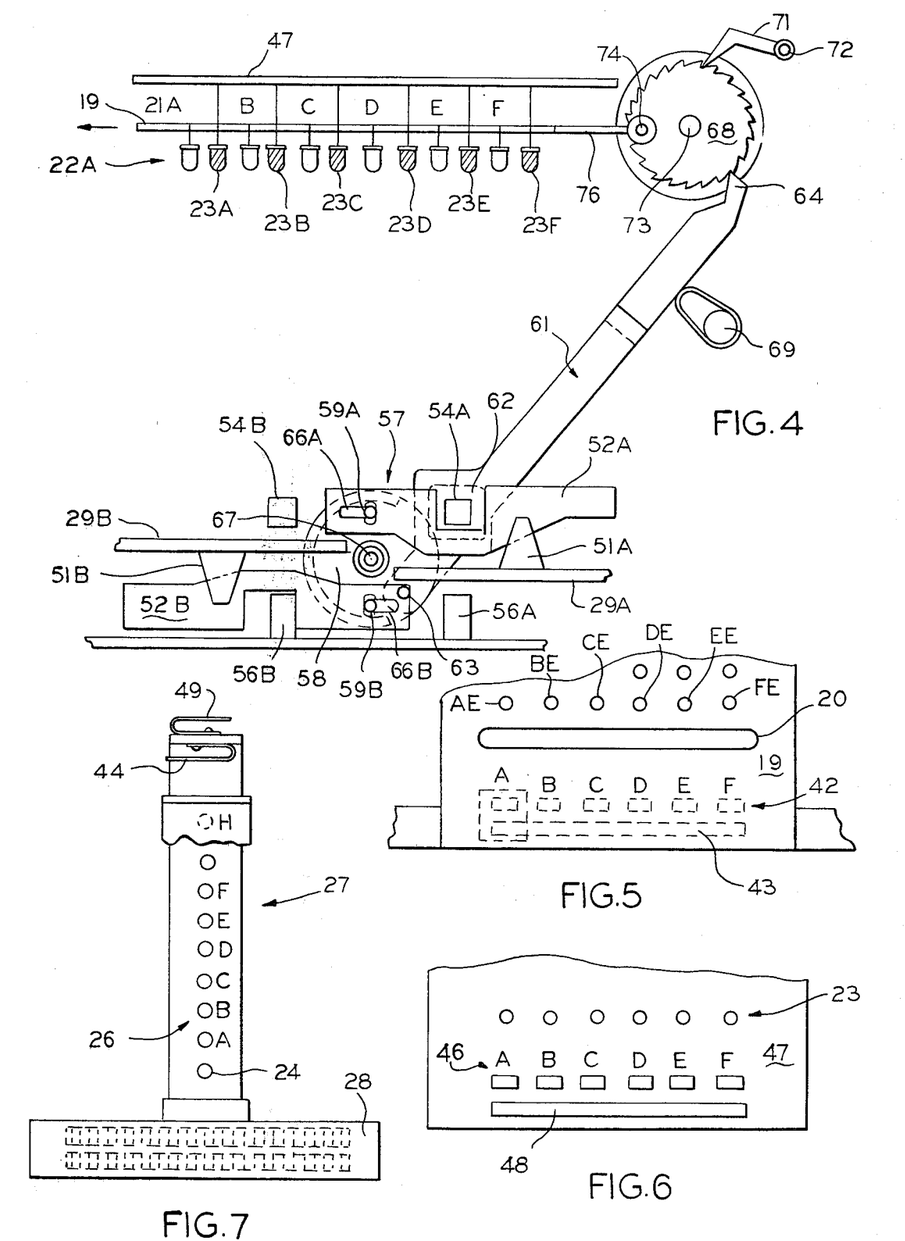
FIG. 4 is a plan view of the mechanical linkage arrangement used for moving various components of the hand-held electronic game.
FIG. 5 is a partial view of the front LED invader board.
FIG. 6 is a partial view of the rear barrier board.
FIG. 7 is a plan view of the defending spaceship wand including ratchet rack.

The linkages and mechanism are shown particularly in FIG. 4. As shown therein, the pawl rods 29A and 29B have affixed thereto cones 51A and 51B, respectively. The cones abut the top surfaces of links 52A and 52B, respectively, to maintain those links in a relatively horizontal plane.

The links, as seen in FIG. 2, are attached to the vertical portion of the defending spaceship moving lever. For example, as shown in FIG. 2, link 52A is attached by any well known means, such as fastener 53, to portion 33 of lever 17A.

The link 52A is shaped to avoid abutting rack supporting standard 54A. A second rack supporting standard 54B is shown spaced apart from standard 54A. Another set of standards 56A and 56B are positioned opposite standards 54A and 54B, respectively, and closer to the front portion of the game. The link 52B is shaped so that it does not abut standard 56B.

When the lever 17A is operated, the link 52A moves laterally to the left causing a crank 57, comprising circular portion 58 and handles 59A and 59B, in turn counterclockwise. The movement of crank 57 counter-clockwise causes pawl link 61 to move diagonally away from the front of the game or away from the viewing screen 14. The pawl link 61 has a cut-away section 62 made particularly to avoid abutment with standard 54A. The pawl link 61 is attached to crank 57 through crank handle 63. The pawl link 61 terminates in a pawl 64 at its end away from the crank.

Lost motion means are provided to isolate the movement of link 52A from the movement of link 52B and vice versa. More particularly, extended apertures in links 52A and 52B are provided at the crank handles 59A and 59B, respectively. Thus, when the crank 57 is moved by link 52A, then the crank handle 59B moves in extended aperture 66B without effecting link 52B. Similarly, when crank 52 is rotated around pivot point 67 responsive to the actuation of link 52B, crank handle 59A moves in extended aperture 66A with no effect on linkage 52A.

The diagonal movement of pawl link 61 causes ratchet wheel 68 to rotate in a clockwise direction. Means, such as resilient retainer 69, assures that pawl 64 meshes with the teeth of ratchet wheel 68. Ratchet lever 71, pivoted around pivot point 72, assures that the ratchet wheel 68 turning around pivot 73 can only rotate in a counter-clockwise direction. Thus, as pawl link 61 moves diagonally towards the front of the game resonsive to releasing lever 17A, for example, and the consequent movement of the lever to its normal position with the consequent movement of link 52A back to its normal position, the crank 57 rotates counter-clockwise moving pawl link 61 towards the front of the game. Any force on the teeth of ratchet wheel 68 cannot move the ratchet wheel clockwise, because of ratchet lever 71.

Accordingly, each time lever 17A or 17B is operated, the wand 27 is moved either right or left relative to the stationary barrier strips, for example. At the same time the spaceship invader matrix is moved right or left depending on its previous position and the position of the ratchet wheeling crank. The space invader matrix board 19 is attached to the ratchet wheel 68 through the off-centered handle 74 and link 76.

Figure 3:
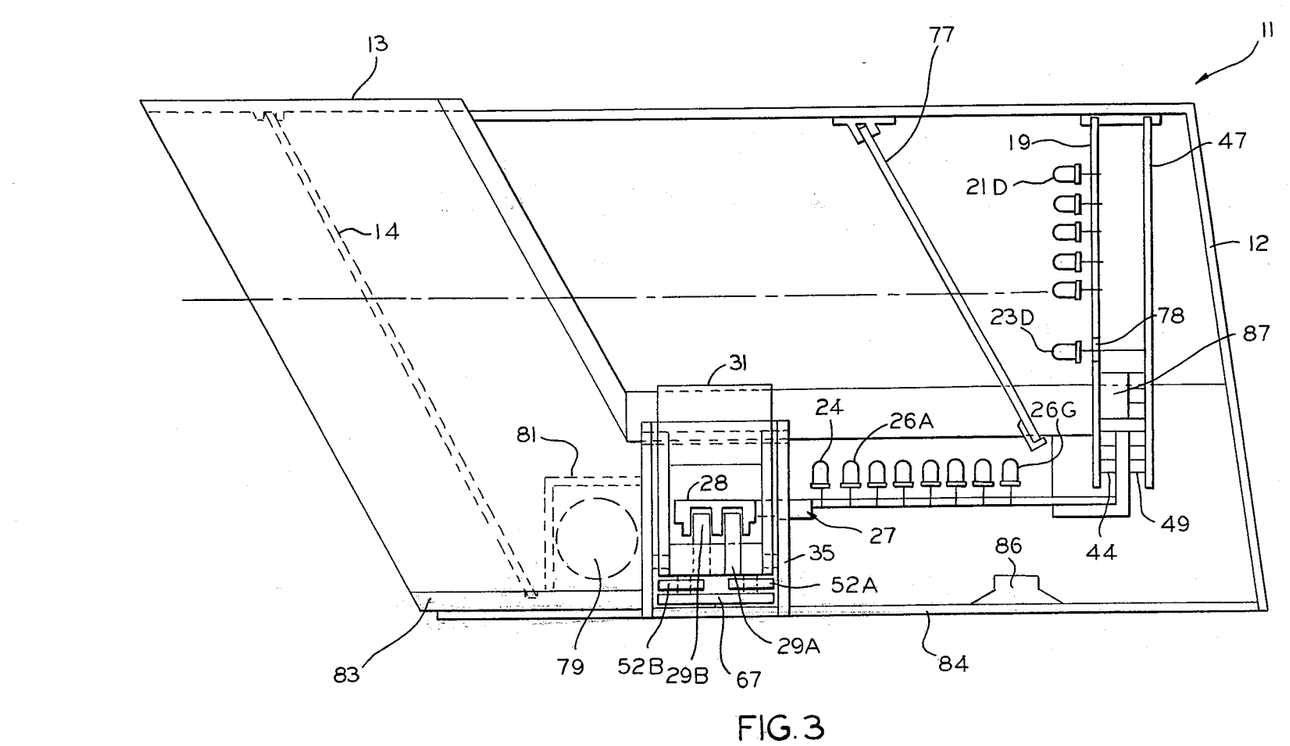
FIG. 3 is a sectional side view of the hand-held electronic game.

The showing of FIG. 3 shows the means for depicting the invading spaceship matrix, the barrier strip and the defending space ship all in the same plane. More particularly, a two-way mirror 77 is shown mounted in the game 11 parallel to the viewing screen 14.

The barrier board 47 is mounted toward the rear of cover 12 in any well known manner. The barrier LED's, such as LED 23D, are shown extending through an extended aperture, such as aperture 20 in matrix board 19. Column 21D of the matrix is shown mounted on board 19 in FIG. 3. The wand 27 is horicontally placed beneath the reflecting surface of two-way mirror 77. Thus, a player looking through the viewing screen 14 and hood section 13 sees the matrix of invading spaceships, the barriers and the defending spaceship all in the same plane.

Means are provided for powering the system. More particularly, batteries, such as battery 79 shown in a battery container 81 mounted on the base 83 of hood section 13. The base 83 of the hood section sets upon the base 84 of the hand-held electronic game. Mounted to the base are the pivot pedestals, such as pivot pedestal 35. Also mounted to base 84 is a loud speaker 86 for providing the sound effects that go with the game. For example, throughout the game there is the "heartbeat" sound effect which varies in tempo—increasing as the game progresses.

Means are provided for indicating to the electronic controls associated with game the relative position of the invading space ships and the barrier strips. More particularly, contact or brush means 87 mounted at the rear of board 19 individually connects conductive segments 88D, 88E or 88F to conductive strip 89, whenever the invaders and the barrier LED's are aligned. Thus, if the matrix board has moved to its left limit, then the brush 87 connects segment 88F to strip 89. When the board is moved to its right limit, then brush 87 connects segment 88D to conducting strip 89.

Figure 8:
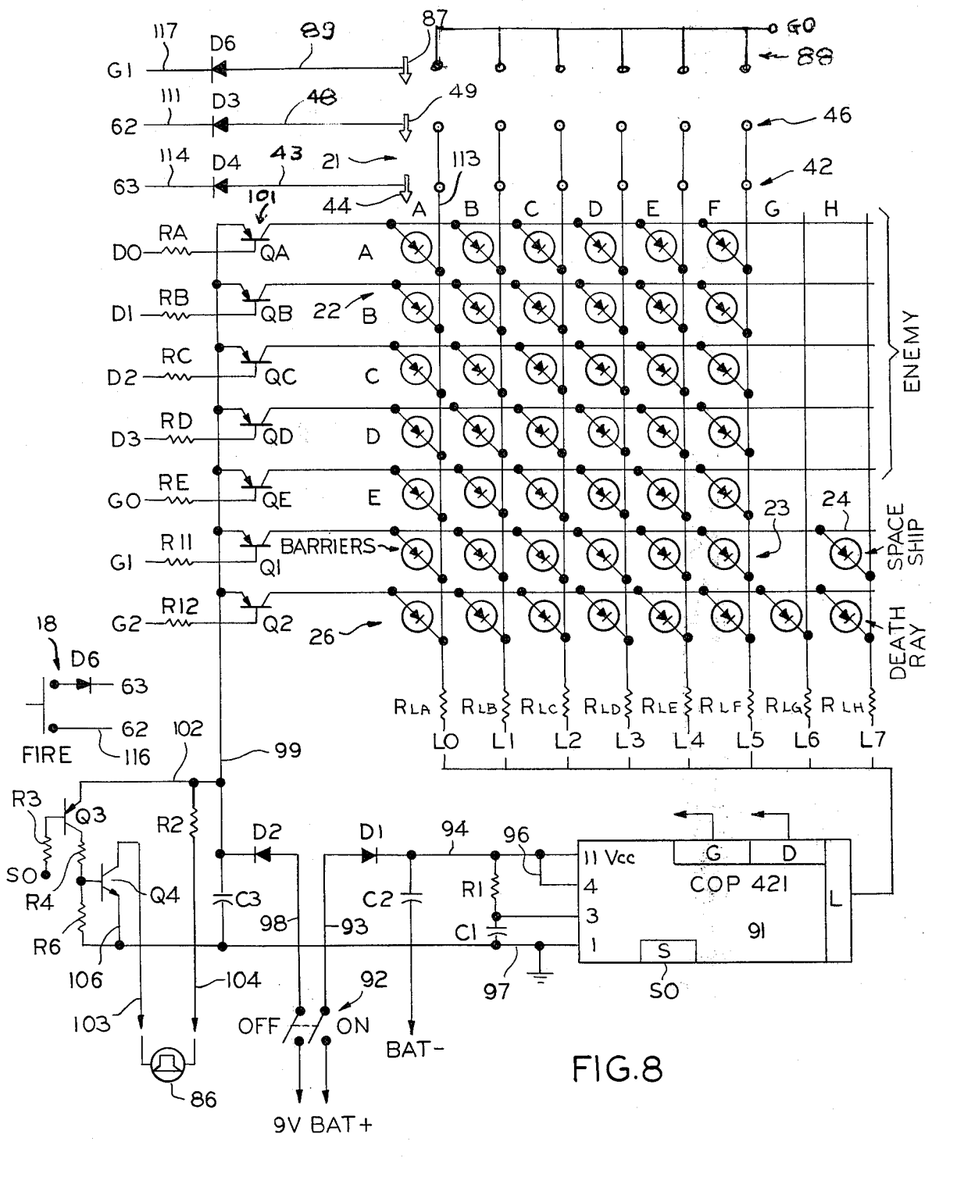
FIG. 8 is a schematic of the electronics used in controlling and depicting the active elements of the hand-held spaceship battle game.

As shown in the schematic of FIG. 8, the electronic heart of the control of the hand-held game is the microprocessor or controller 91. In a preferred embodiment a National Semi-Conductor COP 421 micro-controller is used.

The micro-controller 91 has a plurality of outputs L0 through L7 which are used to control the energization of the LED's, including the invaders, the barriers, the defending spaceships and the death ray by controlling the power to the cathodes of the columns of the LED's. In addition, the micro-controller 91 includes D register outputs and G register outputs connected to the bases of transistors QA - QE and Q1, Q2. The collectors of the transistors are coupled to the anodes of the rows of LED's. In addition, the micro-controller 91 also provides a serial 1/0 register which provides a serial output SO.

A double-pole, single-throw, on-off switch 92 is shown. When switch 92 is operated "on", battery is coupled through the switch conductor 93, diode D1, conductor 94 to the battery input 11 of the controller. In addition, the positive battery is supplied to the reset terminal 4 through conductor 96 to reset the registers and the like. The timing is set where the clock input 3 of the controller is connected to the junction of timing resistor R1 and timing capacitor C1 which are serially connected from conductor 94 to the ground bus 97.

A filter capacitor C2 is connected from conductor 94 to ground bus 97. Ground conductor 97 is also connected to the ground input of controller 91.

The operation of on-off switch 92 to "on" also supplies positive voltage through conductor 98, diode D2 and conductor 99 to the emitters of the series of PNP transistors 101, previously referred to, enabling those transistors.

Another filter capacitor C3 is connected between ground bus 97 and the cathode of diode D2. The conductor 99 is also coupled through conductor 102 to the emitter of PNP transistor Q3. Conductor 102 is connected through resistor R2, conductor 104 to one side of loud speaker 86. The other side of loud speaker 86 is connected through conductor 103 to the collector of NPN transistor amplifier Q4.

The base of transistor Q3 is connected through resistor R3 to the sound output SO of the micro-controller 91. The collector of transistor Q3 is connected through a voltage divider comprising resistors R4 and R6 in series. The base of transistor Q4 is connected through conductor 106 to the ground bus 97. Thus, sound signals from the controller activate the audio amplifier to cause the loud speaker to produce the required sounds.

When the game commences, the processor is programmed to provide negative low signals to points D0, D1, D2, D3, G0, G1 and G2. This causes transistors QA through QE to conduct responsive to low signals at points L0 through L5. At this time there is no low signal at G2. Thus, transistor Q2 does not conduct. There is a low signal at G1, and transistor Q1 conducts causing the barrier LED's 23 to energize. There also is a low signal at L2 causing the defending spaceship 24 to energize.

At the beginning of the game, the barriers and columns of invading spaceships may or may not be aligned. Similarly, the wand may be in a position where the spaceship is or is not aligned with the barrier. The player of the game operates levers 17A and 17B to move the wand so as to cause the spaceship 24 to be positioned as desired.

The position of the spaceship relative to the barriers is indicated to the micro-processor. For example, when the brush 49 abuts the contact segments 46A through 46F on the board, a circuit is completed from G2 of micro-controller 49 through conductor 111, diode D3, contact strip 48, brush 49, conducting segment 46, a vertical conductor on the matrix, such as conductor 113, resistor R LA and back to the terminal L0 of micro-controller 91. The micro-controller is apprised of the position of the defending spaceship relative to the barrier strips in this manner.

Similarly, the position of the defending spaceship relative to the columns of invading spaceships is indicated to the board when brush 44 abuts one of the conducting segments 42. Contact of the brush, segment and strip completes a circuit extending from terminal G3 to terminal L0 through L5 of the micro-controller 91, through conductor 114, diode D4, conductor 43, brush 44, segments 42A through 42F through conductors, such as conductor 113, a resistor, such as R LA, and terminals, such as L0. The described circuit indicates to the micro-controller that a defending spaceship and a column of invaders are aligned. At this time the spaceship is vulnerable to the bombing by the invading spaceships; and the invaders are vulnerable to the death ray of the defending spaceship.

The bombs are dropped randomly. With the initiation of the micro-controller a bomb occurs when the microcontroller sends signals sequentially, for example, down a column. At that time if, for example A column is dropping the bombs, then the light of LED AA will brighten followed sequentially by the lights of LEDs BA, CA, EA and DA. This occurs when a low signal is applied from the micro-controller to the L0 terminal and sequentially through the D0 terminal D1, terminal D2, terminal D3, terminal G0 or the terminal G1.

If, at this time, the defending spaceship is aligned with column A, and not behind a viable barrier, then the spaceship will be "hit" and "destroyed". The micro-controller knows the position of the spaceship at the time of dropping of the bomb and indicates the destruction of the spaceship by a burn and a distinctive noise transmitted through the loud speaker 86. The player still has two remaining defending spaceships.

If, while the spaceship and the invaders are aligned, the player presses the fire button 18, a low signal is transmitted from the G3 terminal of micro-controlled 91 through diode D6, firing switch 18, conductor 116 to the G1, resistor R12 to the base of transistor Q2. This presents a low signal at the G2 terminal of the micro-controller.

Responsive to that low signal, a low signal is applied sequentially to the L0 through L7 terminals of the micro-controller. The signals, in conjunction with the low signal on the base of transistor Q2, cause LED's 26A through 26H to sequentially light up simulating the movement of the death ray.

Since at this time the death ray LED's of the wand overlap the aligned invading spaceships, the first invader overlapped LED is "destroyed" by the death ray. Responsive to the "destruction", the micro-controller sends a signal out through S0 to cause the loud speaker to broadcast a distinctive noise indicating the "destruction" of an invading spaceship. The "destruction" of the invading spaceship is also recorded in the memory for compilation of the final score.

If a dropped bomb and death ray strike each other, then the dropped bomb is not "destroyed". The "destruction" of an invading spaceship stops the death ray; so that the death ray can "destroy" only one invading spaceship per firing. If the death ray is activated when the defending spaceship and invaders are not aligned, then the micro-controller causes a distinctive noise to be broadcast indicating a "miss".

When the barrier LED's are between the invaders and the defending spaceship, neither the invaders nor the defending spaceship can "destroy" each other. However, the randomly strewn bombs of the invaders act to gradually "destroy" the barriers. Similarly, when the death ray of the defending spaceship "hits" the barrier, it also partially "destroys" the barrier. In a preferred embodiment the barrier is "destroyed" after being "hit" 15 times either by bombs or death ray shots. As the barrier is "destroyed", its light becomes less intense. Once the barrier is "destroyed" it no longer protects the defending spaceship from the bombs of the invaders.

The alignment of the invaders and the barriers is indicated when the metallic strip 87 on the board 19 is in contact with the conducting element 89 on the board 47. The conducting element 89 is coupled to terminal G0 of micro-controller 91. The metallic strip 87 is connected from a low signal at terminal G1 of micro-controller 91 through conductor 117, diode D6 and conductor 118 to metallic strip 87. The receipt of the low signal at terminal G0 indicates to the controller that there is alignment between the invaders and the barrier. When there is no low signal on G1, then the barriers have been "destroyed".

The micro-controller 91 may also be programmed to replace "destroyed" invaders by moving the surviving invaders into the closer position of the "destroyed" invader. If a whole column of invaders is "wiped out", the surviving invaders may be randomly moved into that column.

As the game progresses and invaders are "destroyed", the tempo is automatically increased—both the background "heart thumping" sound and the dropping of the random bombs increases in tempo. In addition, the surviving invaders may tend to move "down" to the rows closer to the defending spaceship; thus, giving the defending spaceship less time to "dodge" bombs.

If all of the invaders are "destroyed" before the three defending spaceships are "destroyed", then a whole new array of invaders is provided by the micro-controller, along with a new defending spaceship. Thus, the player obtains a second game. However, the tempo of the second game is automatically greater than the tempo of the first game.

Here again, after a given number of invaders are "destroyed", the tempo further increases and then continually increases throughout the remaining game making it more difficult to "destroy" the entire array of invaders prior to the three defending spaceships being "destroyed".

At the beginning of the program the power is turned on; i.e., "POWER UP". The micro-processor 91 has an automatic power up reset. The power up reset clears the accumulator, resets the E register of the micro-processor and sets the RAM pointer "B" to 0,0. Then, all RAM outputs are set to binary 1's (Hex F). The program is comprised of a large main loop. Alternate paths are taken within the main loop, depending on the status of different "flags" or outputs during the transversal of the loop. A RAM cell, herein called GAME-STATUS, selects one of the paths of the loop. The loop paths comprise OPENING, GAME, POSTGAME and FRESH ARRAY.

Setting all of the RAM outputs to the binary 1's sets the GAME STATUS to F which consequently selects the OPENING block. The OPENING program portion bleeps and blinks for each of the defending spaceships in the player's possession. The background (heartbeat) sound is turned on. The barriers are set up with all fresh values, and then the invaders are set in the matrix. GAME STATUS is then set to GAME and the path goes through the GAME block. GAME is the block or path followed during the actual play. The path continuation during the play is controlled by flags. There are flags for: invader hit; spaceship hit, laser on and bombs on.

If any of these flags are tripped, then initiation housekeeping values will be set in the GAME block followed by the setting of flag 33. Flag 33 is the flag used to remember that one of the other flags is up and initiation housekeeping has been down. Flag 33 also controls flow through the TASKLIST.

When it's an "invader hit" flag that is up, the hit invader is turned off. The score is incremented, and the invader hit sound is broadcast. If all the invaders are "dead" with this invader hit, the GAME STATUS is changed to call for a FRESH ARRAY. If the "spaceship hit" flag is up, the defending spaceship is burnt, the number of spaceships available to the defender is decreased, and the spaceship hit sound is broadcast. The burning of the defending spaceship is accomplished by a temporary high power transmitted to the spaceship to cause it to brighten. If the three defending spaceships are wiped out, then GAME STATUS is set to POSTGAME. If there are defending spaceships remaining, the number of defending spacehips is beeped and blinked and play continues.

If the "laser on" flag is up, the laser LED's are sequentially lit brightly and the laser sound is broadcast. When the "bombs on" flag is up, the LED's in that column sequentially burn. If flag 33 is active, all tasks, except TASK 1 are omitted. Obviously, this shortens the large loop.

The sounds to be broadcast are inserted when the GAME block flips the speaker on and inserts variable delays in the large loop. The burns are accomplished by turning on the LED's to be burnt and inserting delays in the energization of those LED's.

In the POSTGAME block, the initiation array is centered so that all remaining enemy or invading spaceships can be readily seen. The background sound is on; flag 33 is set to suppress all other activity, such as laser and missile on. The POSTGAME block monitors fire; and, if fire has been held on for a suitable length of time, POSTGAME calls for a FRESH ARRAY. Each FRESH ARRAY gives the player one defending spaceship as a bonus. Each FRESH ARRAY moves and drops bombs at a faster tempo.

Thus, the player can force the game to a higher skill lever, then he has actually achieved by wiping out all of the invaders. However, his activity at the higher skill level is limited to one spaceship. This allows the player to observe the higher tempos and practice at them. The unique feature can be used repetitively to get to higher and higher skill levels.

POSTGAME also indicates the number of arrays "killed" by the invading spaceships in code by blinking appropriate barrier lights. FRESH ARRAY sets all RAM outputs to F, except one corner containing the number of defending spaceships and the score. The program then goes to OPENING. When going to OPENING from FRESH ARRAY, the player gets one defending spaceship.

The large loop always flows through a block called "MAIN LOOP". MAIN LOOP broadcasts background sound, if the control flag is on background sound. MAIN LOOP also decrements display row pointer correcting it as required, assembles the list output word and stores it in the appropriate RAM cells. MAIN LOOP turns the display off. It reads the inputs (fire button and three barrier switches read through L PORT and 2 reads of one byte each outputs new display to G and L PORTS) and turns display back on.

TASKLIST follows MAIN LOOP and it directs the program through one of the six tasks based on the value of the display row pointer. If flag 33 is active, then all tasks, except TASK 1, are omitted. The tasks are followed by the equalizing delays. The DELAYS are followed by STATUS which tests GAME STATUS and directs the program accordingly. The large loop is now closed.

TASK 1 provides background sound and advances all timers. Some of the timers are fixed speed and advance with the number of frames displayed. It must be noted that while the array appears to be on continuously, it is actually blinking at a speed; i.e., the number of frames per second, sufficient to cause it to appear to the eye to be on continuously.

So, some of the timers use the frame MUX rate as their base. Other timers are variable and speed up as the score increases. This is what causes the game to accelerate as the player goes through a single array and as he wipes out more and more arrays of invaders.

TASK 2 moves the array left and right. The array moves left until a "live" invader is sensed in the far left (blind) corner. The array is then switched to move to the right and continuous until a "live" invader is sensed in the far right (blind) corner. The motion speeds up as the score increases.

TASK 3 fires invader bombs down upon the defending spaceship.

TASK 4 fires a laser up at the invaders in response to the fire button.

TASK 5 translates the input information obtained during the MAIN LOOP into actual column numbers for use by other parts of the program.

TASK 6 assembles a barrier word for driving the barrier LED's from the barrier values. There is one nibble for each barrier. These are initiated at different strengths to adjust for edge effects by the OPENING. Each hit upon a barrier increments the value by 2 with a cutoff value of 15. As the value approaches 15, the barrier is blinked, the signal gets weak. This is accomplished by providing alternate output values of the bit controlling the barrier LED. At 15, the barrier goes out.

In summary, when the game is turned on, the defending spaceship will signal on sound and one blip for each of the three ships with which the player starts. The barriers then the array of 30 enemy invaders appears in view. The enemy invaders drop bombs at the player's defending spaceship seeking to destroy the defending spaceship. The player controls the move of the spaceship and the firing of the laser gun attempting to destroy as many of the invaders as he can.

The invading spaceships are located on one plane. The defending spaceships are located in a plane substantially normal to the plane of the invaders. Six barriers fixed to a plane parallel to and spaced apart from the invaders' plane are used to help protect the defender from the dropping bombs. As the invading arrays become increasingly depleted, the movement of the invaders and the frequency of the bombs dropping increases accompanied by an increase in the tempo of the background sound.

If an array is completely destroyed before the three defenders are destroyed, a new array is provided and begins movement with the speed faster than that of the previous array. An extra spaceship is awarded to the player when an array is successfully obliterated.

The game ends when all defending spaceships are destroyed. At that time the score is indicated by the array.

The enemy bombs drop one at a time from the first two arrays and two at a time from arrays 3 on. A bomb and laser do not cancel when on the same path. If no barrier separates the two, then both the invader and the defender are vulnerable to weapons simultaneously fired on the same path. The spaceship's laser always fires faster than the invaders' bombs.

If a defender is hit, it will beep one time per spaceship left. When all the defenders are destroyed by the invaders, the surviving invaders are frozen on the array and the four left side barriers are lit to tell how many arrays are cleaned out. From left to right, numerical values fo the four barriers are 1, 2, 4 and 8. The number of arrays cleaned out is indicated by the sum of any of the four scoring barriers that are blinking.

The program was used to develop a program of ROM values for the micro-processor using the COP 400 Product Development System User's Manual c 1978 and the addendum of 1979, National Semi-Conductor Ser. No. 420305548-00 in conjunction with the COP 400 Micro-controller Family Chips User's Manual—N SEMICON Serial Number 420305785-001 dated January 1979, all available through National Semi-Conductor Company.

Typical ROM values for a preferred embodiment are shown on the accompanying Table 1.

While the principles of the invention have been described above in connection with specific apparatus and applications, it is to be understood that this description is made by way of example only, and not as a limitation on the invention.

TABLE 1

| ROM VALUES: | | | | | | | | | | | | | | | | |
|---|---|---|---|---|---|---|---|---|---|---|---|---|---|---|---|---|
| 000 | 00 | 0F | 12 | B2 | 04 | C3 | 12 | 5D | C2 | 9F | 8B | DF | 0F | 70 | 77 | 78 |
| 010 | 74 | 72 | 9D | 77 | 70 | 71 | 77 | 72 | 2C | 43 | 68 | 5F | E9 | 08 | C3 | 0F |
| 020 | AF | 33 | 81 | 77 | 78 | 05 | 52 | 04 | D1 | 23 | 04 | 5F | DD | 5F | 61 | 80 |
| 030 | 5F | 61 | 5F | 62 | FB | 4E | 2C | 13 | 68 | 3C | 60 | 29 | 1F | 06 | 00 | 5E |
| 040 | 51 | C0 | 8B | 60 | 3E | 48 | 23 | 27 | 40 | 5F | 61 | FD | 2C | 13 | D1 | 60 |
| 050 | 29 | 5F | 63 | B4 | 5F | 62 | 40 | 5F | 62 | 80 | 5F | 63 | 27 | 63 | 84 | 33 |
| 060 | 83 | 83 | 05 | 23 | B3 | 48 | 88 | B5 | 88 | 48 | 96 | 48 | 19 | 60 | 99 | AF |
| 070 | 20 | 48 | 49 | 6B | A4 | 11 | 00 | 23 | 88 | 48 | 00 | 53 | 02 | 06 | 48 | 00 |
| 080 | 63 | CA | FA | CE | C0 | C7 | D9 | E1 | F1 | 60 | 66 | 60 | 6F | 60 | 6A | F9 |
| 090 | 00 | 58 | F6 | 00 | 59 | F6 | 09 | 33 | 93 | 00 | F6 | 33 | 88 | 33 | A8 | 33 |
| 0A0 | 84 | 33 | A6 | 33 | A7 | 33 | 97 | 48 | 61 | 00 | 0E | 08 | 0F | 60 | 35 | 00 |
| 0B0 | 22 | F2 | 00 | 5F | 48 | 12 | 51 | CC | 00 | 00 | 00 | 00 | 00 | 00 | 00 | 00 |
| 0C0 | 4E | 23 | A3 | 12 | 23 | 98 | 48 | 23 | 23 | 50 | 23 | 18 | 12 | 48 | 32 | 05 |
| 0D0 | 5F | 22 | F4 | 33 | 97 | 15 | 33 | 3C | 48 | 2B | 01 | 33 | 61 | 11 | 33 | 69 |
| 0E0 | 48 | 2B | 01 | 33 | 65 | 11 | 33 | 6D | 48 | 05 | 40 | 23 | A3 | 05 | 59 | 44 |
| 0F0 | C4 | 05 | 30 | 44 | 06 | 48 | 21 | 48 | 49 | 00 | 21 | 49 | 48 | 00 | 00 | 00 |
| 100 | 2B | 13 | C6 | 03 | 68 | 7A | A3 | 05 | 55 | 83 | 05 | 58 | 06 | 35 | 50 | |
| 110 | 15 | 23 | 87 | 05 | A5 | 04 | 73 | 33 | 87 | 6B | A4 | B5 | 4B | 46 | A3 | 00 |
| 120 | 5B | 21 | E9 | 2E | 03 | E8 | A5 | 42 | FC | 05 | 54 | E8 | 5C | 9D | 21 | F2 |
| 130 | A5 | 43 | 5C | 44 | 82 | E6 | A1 | 21 | E8 | 2E | 13 | E6 | 86 | 0E | 33 | 3E |
| 140 | 33 | 57 | 33 | 85 | 33 | 2E | 16 | 14 | 33 | 5B | 33 | 2E | 16 | 06 | 6B | D9 |
| 150 | 68 | D3 | 87 | 60 | 46 | 23 | 23 | 23 | 98 | 6B | A4 | 9B | 01 | 49 | 48 | 8D |
| 160 | A8 | 6A | 28 | A8 | 2B | 4B | 39 | 79 | 78 | 78 | 78 | 78 | 79 | 1A | 90 | F5 |
| 170 | 04 | EE | 9F | 71 | A8 | 16 | 71 | 63 | B4 | 00 | 00 | 00 | 00 | 00 | 00 | 00 |
| 180 | 2C | 13 | C4 | D8 | B2 | 21 | CF | 2D | 21 | CF | 00 | 56 | 68 | 3C | A8 | 2B |
| 190 | 43 | 2F | 7C | 7F | 19 | 78 | 2C | 43 | 2D | 03 | F9 | 8D | F2 | 2D | 46 | 9D |
| 1A0 | 76 | 33 | 82 | 05 | 54 | F0 | 07 | AF | 05 | 51 | 61 | F8 | 9F | 70 | 60 | 29 |
| 1B0 | 06 | EA | 2B | 46 | 19 | 05 | 57 | 7E | A8 | 13 | 61 | E3 | 8D | 61 | C2 | 33 |
| 1C0 | A1 | 83 | 23 | 21 | 51 | CE | 9B | 7B | 9B | 93 | 80 | 6B | 16 | A8 | 51 | D4 |

TABLE 1-continued

| | | | | | | | | | | | | | | | |
|---|---|---|---|---|---|---|---|---|---|---|---|---|---|---|---|
| 1D0 | 2B | 42 | 61 | BF | 8D | A8 | 6A | 28 | A8 | 2D | 4B | 33 | 83 | 99 | F8 | 9F |
| 1E0 | 73 | 60 | 29 | 2C | 01 | E9 | 6B | E5 | FA | 11 | F8 | A1 | 93 | EF | F3 | 23 |
| 1F0 | 36 | A1 | 80 | 2F | 7E | 6B | 20 | F8 | 2B | 4B | 2C | 4B | A8 | 2B | 05 | 54 |
| ROM VALUES: | | | | | | | | | | | | | | | | |
| 200 | 5C | 68 | 7A | 09 | 8B | 62 | 09 | 19 | AF | 97 | DC | 23 | 01 | 44 | 06 | 23 |
| 210 | 00 | B0 | 20 | D5 | 70 | 33 | 94 | AF | 2B | 13 | DE | AC | AF | AC | 23 | 14 |
| 220 | 12 | 12 | 5D | E6 | 7D | AC | 7A | AC | 19 | 7C | 33 | B3 | 99 | F1 | 2E | 42 |
| 230 | 49 | 2B | 03 | F8 | 75 | 2E | 42 | 48 | 42 | 2E | 46 | 33 | B3 | 83 | 48 | 00 |
| 240 | 23 | 28 | 51 | C5 | AC | 97 | AC | 33 | 94 | 99 | D3 | D9 | 2E | 01 | 2A | 29 |
| 250 | 6B | 9D | FA | 23 | 00 | 58 | AC | 90 | AC | 2E | 01 | EA | 1A | 32 | 13 | E1 |
| 260 | 22 | 06 | 04 | DE | 2E | 47 | 20 | F8 | 4D | 45 | 0A | 32 | 01 | EF | 22 | 06 |
| 270 | 04 | EC | 2E | 47 | 20 | F8 | 4C | 45 | 28 | 7A | 28 | 8B | CC | AA | 00 | 00 |
| 280 | A1 | 07 | 04 | 16 | 07 | 04 | 16 | 99 | F7 | 23 | 00 | 5E | CE | D1 | 09 | 01 |
| 290 | AC | 33 | 92 | AF | 01 | DA | 38 | 99 | DC | D1 | 13 | AF | 05 | 33 | B6 | E6 |
| 2A0 | 33 | B6 | 8B | E5 | AA | 05 | 56 | E6 | 5A | 06 | 68 | E9 | 0E | 68 | 73 | 69 |
| 2B0 | 55 | E0 | A1 | 7F | 2C | 45 | AA | 38 | 23 | 36 | 21 | 62 | C9 | 33 | B8 | 8F |
| 2C0 | C6 | 05 | 50 | 05 | 51 | C9 | 2E | 4B | CB | 2E | 43 | 09 | 11 | AC | 03 | AC |
| 2D0 | A1 | 83 | 93 | EE | 33 | 95 | 03 | EA | 23 | 36 | 3E | 50 | 05 | 51 | E0 | EA |
| 2E0 | 06 | A1 | 23 | 01 | 52 | 40 | 06 | 2C | 47 | AC | 2E | 13 | AC | E1 | 00 | 57 |
| 2F0 | 21 | AC | 2E | 13 | F6 | E1 | 2D | 43 | 68 | 5F | E1 | 2E | 46 | 11 | 62 | 59 |
| 300 | 2B | 4B | 2C | 77 | 19 | 23 | 00 | 11 | 00 | 08 | 16 | B2 | 16 | 89 | 23 | 15 |
| 310 | 58 | 8D | A8 | 9F | AF | A8 | 2F | 23 | 0A | 50 | 05 | 23 | A0 | DE | 2B | 46 |
| 320 | 2F | 15 | 06 | 3F | 8B | E3 | 48 | 9D | 05 | 58 | 58 | 63 | 3F | 59 | 63 | 4E |
| 330 | 23 | 15 | 58 | 63 | 37 | 77 | AC | 78 | 2C | 4C | 23 | 39 | 23 | B7 | AC | 09 |
| 340 | 01 | AC | 9D | 00 | 59 | 21 | E4 | 33 | B8 | 99 | DE | D4 | 06 | D7 | 23 | 15 |
| 350 | 58 | AC | 96 | AC | 9D | 8B | AC | 2B | 4B | 2C | 4D | 9D | 76 | AC | 05 | 50 |
| 360 | 05 | 51 | CC | D4 | 05 | 55 | D4 | 33 | B7 | 99 | EC | D4 | 23 | 39 | 21 | 63 |
| 370 | 82 | 68 | E9 | 23 | 28 | 0F | 50 | 68 | 73 | 47 | 69 | 55 | 63 | 54 | 2D | 42 |
| 380 | 63 | 59 | 70 | AA | 33 | B8 | 7A | 33 | 86 | 89 | 03 | CD | D1 | 33 | B8 | 8B |
| 390 | C7 | 38 | 7A | 33 | 85 | 89 | 03 | D9 | AB | 38 | 8B | D3 | AB | 05 | 23 | 98 |
| 3A0 | 28 | 05 | 0E | 50 | 23 | 18 | 5F | 48 | 23 | 98 | 32 | 88 | B5 | 88 | 00 | 12 |
| 3B0 | 00 | B1 | 63 | A4 | 39 | AF | 06 | 53 | 63 | BF | 23 | 0A | 53 | 5D | 22 | 84 |
| 3C0 | 08 | 89 | 85 | 06 | 04 | 63 | B5 | 08 | 89 | AA | 58 | 44 | 23 | B2 | 84 | 86 |
| 3D0 | 85 | 6B | DA | B2 | 33 | B2 | BF | 87 | 48 | A3 | B2 | BF | 9B | 33 | 2C | 33 |
| 3E0 | 3A | 50 | 33 | 3E | 48 | 23 | 0A | 58 | 40 | 40 | 23 | A0 | 63 | 1E | 00 | 00 |
| 3F0 | 7F | BF | DF | EF | F7 | FB | FD | FE | FF | DF | FF | EF | F7 | FB | FD | FE |

What is claimed is:

1. A hand-held programmed electronic game for playing by individuals holding said electronic game,
   said game comprising first electronically controlled lights for depicting invaders and bombs,
   second electronically controlled lights for depicting defenders and death rays,
   third electronically controlled lights visually interposed between said electronically controlled lights depicting said defenders and said electronically controlled lights depicting invaders for depicting barriers impenetrable by said bombs and death rays,
   said first and second electronically controlled lights affixed in first and second planes respectively, and
   means for causing individuals to see said first, second and third electronically controlled lights in a single plane.

2. The hand-held programmed electronic game of claim 1 wherein the first and second planes are at right angles to each other.

3. The hand-held programmed electronic game of claim 2 wherein said first and third electronically controlled lights are in substantially the same plane and spaced apart from each other.

4. The hand-held programmed electronic game of claim 3 wherein said first electronically controlled lights comprise an array of electronically controlled lights mounted on a first board,
   said array comprising a plurality of columns and a plurality of rows,
   said third electronically controlled lights comprising a single light for each column of said array mounted on a second board, and
   said second electronically controlled lights comprising a single column of said lights mounted on a wand.

5. The hand-held programmed electronic game of claim 4 wherein an extended aperture is provided in said first board below said array to provide visible access to said third electronically controlled lights.

6. The hand-held programmed electronic game of claim 5 wherein said means for causing the players to see said first, second and third electronically controlled lights on a single plane comprises two-way mirror means angularly mounted between said first and second planes.

7. The hand-held programmed electronic game of claim 6 including means for selectively moving the wand to the right or to the left to avoid being hit by bombs and to hit the invaders with the death rays.

8. The hand-held programmed electronic game of claim 7 wherein the means for selectively moving the wand also moves the first board.

9. The hand-held programmed electronic game of claim 8 wherein said means for moving the wand with said second electronically controlled lights also moves the first board with said first electronically controlled lights alternately as far as it will go from one side to the other side.

10. The hand-held programmed electronic game of claim 9 including handle means on said game, whereby said player can hold said game while manipulating the controls and looking into the viewing screen,
   said means for selectively moving the wand comprises push-button lever means mounted in said handle means,
   pawl means attached to said push-button lever means, ratchet means moved by said pawl means, and means for attaching said wand to said ratchet means.

11. The hand-held programmed electronic game of claim 10 including lost motion linkage means coupling said push-button lever means to said first board, whereby said first board is moved alternately right and left responsive to the operation of said push-button lever.

12. The hand-held programmed electronic game of claim 11 wherein said third electronically controlled lights remain stationary during the movement of said first board and said wand, and means for selectively firing said death ray.

13. The hand-held programmed electronic game of claim 12 wherein said program is contained in a microprocessor, and means for sensing the when said lights depicting defenders and death rays are aligned with said lights depicting invaders and bombs.

14. The hand-held programmed electronic game of claim 12 including means for sensing when the electronically lights depicting defenders and death rays are aligned with the lights depicting barriers.

15. The hand-held programmed electronic game of claim 12 including means for sensing when said columns of said first electronically controlled lights depicting invaders are aligned with said third electronically controlled lights depicting barriers.

16. The hand-held programmed electronic game of claim 12 wherein contact material is mounted on said first board aligned with each of said columns, invader column sensing contacts mounted on said wand for completing a circuit from said first board contact material to indicate alignment of said wand with said column, contact material mounted on said second board aligned with each of said barrier lights, barrier light sensing contacts mounted on said wand for completing a circuit from said second board contact material to indicate alignment of said wand with said barriers, further contact material mounted on said second board, and barrier sensing contacts mounted on said first board for completing a circuit through said further contact material to indicate alignment of said columns with said barriers.

17. The hand-held programmed electronic game of claim 16 including means for increasing the tempo of operation of the game to enable the game to be played at different skill levels.

18. The hand-held programmed electronic game of claim 17 including means for automatically increasing the tempo of the game responsive to the destruction of complete arrays, and means for enabling the increase of the tempo of the game independently of the destruction of complete arrays.

19. A hand-held programmed electronic game for playing by individual players holding said electronic game, said game comprising a first set of LED's mounted on a first board, said first set of LED's arranged in a matrix array of columns and rows and depicting invaders, a second set of LED's mounted in a single column on a wand depicting a defending spaceship and its death ray, said wand mounted at right angles to said first board, and means for causing the players to see said first board and said wand on a single plane.

20. The hand-held programmed electronic game of claim 19 wherein said first board has an extended aperture therein, second board means having an LED thereon for each of said columns, and said extended aperture means in said first board enabling viewing of said second board LED's in said one plane.

21. The hand-held programmed electronic game of claim 20 wherein said means for causing said players to see the LED's on a single plane comprises a two-way mirror angularly mounted between said first board and said wand.

22. The hand-held programmed electronic game of claim 21 including means for selectively moving said wand to the right or to the left, means responsive to the movement of said wand to the right or to the left for moving said first board alternately to the right limits and left limits, said second board being stationary.

* * * * *

UNITED STATES PATENT AND TRADEMARK OFFICE
CERTIFICATE OF CORRECTION

PATENT NO. : 4,345,764
DATED : August 24, 1982
INVENTOR(S) : GORDON A. BARLOW, JOHN R. KRUTSCH, RICHARD A KARLIN It is certified that error appears in the above-identified patent and that said Letters Patent are hereby corrected as shown below:

Col. 5, line 24: "in" should be --to--.

Signed and Sealed this

Twenty-seventh Day of September 1983

[SEAL]

Attest:

GERALD J. MOSSINGHOFF

Attesting Officer   Commissioner of Patents and Trademarks